United States Patent [19]
Richardson et al.

[11] Patent Number: 6,004,698
[45] Date of Patent: Dec. 21, 1999

[54] SOLID POLYMER ELECTROLYTE ELECTROCHEMICAL STORAGE CELL CONTAINING A REDOX SHUTTLE ADDITIVE FOR OVERCHARGE PROTECTION

[75] Inventors: Thomas J. Richardson, Oakland; Philip N. Ross, Moraga, both of Calif.

[73] Assignee: The United States of America as represented by the United States Department of Energy, Washington, D.C.

[21] Appl. No.: 08/915,612

[22] Filed: Aug. 21, 1997

[51] Int. Cl.$^6$ .................................................. H01M 6/18
[52] U.S. Cl. .................. 429/305; 429/307; 429/312; 429/315; 429/322; 429/231.95; 252/62.2
[58] Field of Search .................... 429/305, 306, 429/304, 307, 310, 312, 314, 315, 322, 231.95; 252/62.2

[56] References Cited

U.S. PATENT DOCUMENTS

| | | | |
|---|---|---|---|
| 4,857,423 | 8/1989 | Abraham et al. | 429/194 |
| 5,536,599 | 7/1996 | Alamgir et al. | 429/212 |
| 5,686,201 | 11/1997 | Chu | 429/52 |
| 5,789,108 | 8/1998 | Chu | 429/213 |

OTHER PUBLICATIONS

Abraham, K.M., et al., "n–Butylferrocene for Overcharge Protection of Secondary Lithium Batteries", *J. Electrochem. Soc.*, vol. 137, No. 6, Jun. 1990, pp. 1856–1857.

Abraham, K.M., et al., "Overcharge Protection of Secondary Lithium Batteries", *Proceedings of 33rd International Power Sources Symposium*, Jun. 13–16, 1988, pp. 38–44.

Behl, Wishvender K., et al., "Electrochemical Overcharge Protection of Rechargeable Lithium Batteries; I. Kinetics . . . ", *J. Electrochem. Soc.*, vol. 135, No. 1, Jan. 1988, pp. 16–21.

Behl, Wishvender K., et al., "Electrochemical Overcharge Protection of Rechargeable Lithium Batteries; II. Effect . . . ", *J. Electrochem. Soc.*, vol. 135, No. 1, Jan. 1988, pp. 21–25.

Cha, C.S., et al., "polypyridine Complexes of Iron Used as Redox Shuttles for Overcharge Protection of Secondary Lithium Batteries", *Journal of Power Sources*, vol. 54, 1995, pp. 255–258.

Golovin, M. Neal, et al., "Applications of Metallocenes in Rechargeable Lithium Batteries for Overcharge Protection", *J. Electrochem. Soc.*, vol. 139, No. 1, Jan. 1992, pp. 5–10.

Halpert, G., et al., "Status of the Development of Rechargeable Lithium Cells", *Journal of Power Sources*, vol. 47, 1994, pp. 287–294.

Narayanan, S.R., et al., "Analysis of Redox Additive–Based Overcharge Protection for Rechargeable Lithium Batteries", *J. Electrochem. Soc.*, vol. 138, No. 8, Aug. 1991, pp. 2224–2229.

*Primary Examiner*—Maria Nuzzolillo
*Assistant Examiner*—Laura Weiner
*Attorney, Agent, or Firm*—William C. Daubenspeck; William R. Moser; Paul A. Gottlieb

[57] ABSTRACT

A class of organic redox shuttle additives is described, preferably comprising nitrogen-containing aromatics compounds, which can be used in a high temperature (85° C. or higher) electrochemical storage cell comprising a positive electrode, a negative electrode, and a solid polymer electrolyte to provide overcharge protection to the cell. The organic redox additives or shuttles are characterized by a high diffusion coefficient of at least $2.1 \times 10^{-8}$ cm$^2$/second and a high onset potential of 2.5 volts or higher. Examples of such organic redox shuttle additives include an alkali metal salt of 1,2,4-triazole, an alkali metal salt of imidazole, 2,3,5,6-tetramethylpyrazine, 1,3,5-tricyanobenzene, and a dialkali metal salt of 3-4-dihydroxy-3-cyclobutene-1,2-dione.

14 Claims, 1 Drawing Sheet

SOLID POLYMER ELECTROLYTE ELECTROCHEMICAL STORAGE CELL CONTAINING A REDOX SHUTTLE ADDITIVE FOR OVERCHARGE PROTECTION

The United States has rights in this invention pursuant to Contract No. DE-AC03-76SF00098 between the United States Department of Energy and the University of California for the operation of the Ernest Orlando Lawrence Berkeley National Laboratory.

BACKGROUND OF THE INVENTION

This invention relates to solid polymer electrolyte rechargeable electrochemical storage cells. More particularly, this invention relates to organic redox shuttle additives for solid polymer electrolyte rechargeable electrochemical storage cells to provide overcharge protection to the cell.

Electrochemical storage batteries of all types are susceptible to damage due to overcharging or overdischarging. Overcharging of an electrochemical storage cell in a battery may be defined as charging beyond a cell's capacity, or at a rate greater than the cell's ability to accept such charge. The damage to the cell which may occur from such overcharging may include degradation of the electrodes, the current collectors, the electrolyte, and the separators between the electrodes. In addition, internal shorting and gas evolution which may result from such overcharging can result in unstable and even dangerous conditions.

Protection against overcharging of a single cell, or a battery comprising a small stack of series-connected cells, may be achieved through direct monitoring (potentiometric, galvanometric, thermal, etc.), control of charging rates, and state of charge. However, for a large (typically bipolar) stack of cells of the magnitude required, for example, in batteries for use in electric vehicles, these methods are impractical due to their complexity, weight requirements, and expense. Underutilization of capacity or addition of immobile electroactive chemicals to one or more of the electrodes may provide some protection (at a considerable cost), but such techniques are ineffective against significant deterioration of capacity within a single cell, which is generally cumulative, and which may lead to a short or an open circuit.

For cells utilizing liquid electrolytes, a "redox shuttle" has been proposed as an approach to solving the problem of overcharging. This approach employs an electrolyte additive which is inactive under normal conditions, but which oxidizes at the positive electrode when the cell potential exceeds the desired voltage, i.e., when the cell is in an overcharge state. The oxidized form of the shuttle additive diffuses through the cell to the negative electrode where it is reduced to its original (unoxidized) state and then the reduced form of the redox shuttle species diffuses through the cell back to the positive electrode to continue the redox cycle. The net effect is an internal shunt which prevents damage to the cell by imposing a limit on cell potential.

However, the requirements for such a "redox shuttle" additive are stringent. The shuttle material, in both its oxidized and reduced forms, must be nonreactive with all cell components. The onset potential for oxidation of the shuttle material must be slightly above that of the desired maximum cell potential to prevent self-discharge during storage, and to allow for some overpotential during charging. Furthermore, the shuttle additive must be present at a sufficient concentration and have a high enough diffusion coefficient (in both its oxidized and reduced forms) to be capable of providing a shuttle current at least as great as the current rate at which the cell is being charged. Additional desirable properties for the additive include a low equivalent weight, low volatility, low toxicity, and low cost.

With respect to the concentration and diffusion coefficient of the additive, such requirements are summarized for a parallel electrode configuration by the following expression:

$$I_s = (nFADC/d)\exp\{(E-E^0)nF/RT\}/[1+\exp\{(E-E^0)nF/RT\}] \quad (1)$$

where:
$I_s$ is the current carried by the redox shuttle additive;
n is the number of electrons transferred to or from the shuttle at the electrodes;
F is the Faraday constant;
A is the electrode area;
D is an effective diffusion coefficient taking into account the diffusion properties of both the oxidized and reduced forms of the shuttle;
C is the total concentration of the diffusion species;
d is the distance between the electrodes;
E is the cell potential; and
$E^0$ is the potential of the redox shuttle couple.
For $E \gg E^0$, the limiting shuttle current becomes:

$$I_s = nFADC/d. \quad (2)$$

Various shuttle materials have been suggested for use in rechargeable lithium cells utilizing liquid electrolytes. For example, Narayanan et al., in "Analysis of Redox Additive-Based Overcharge Protection for Rechargeable Lithium Batteries", published in the Journal of the Electrochemical Society, Vol. 138, No. 8 (1991) pp. 2224–2229, suggests the use of 1,1'-dimethylferrocene as a shuttle material in a liquid electrolyte comprising $LiAsF_6$ and 2-methyltetrahydrofuran, while Abraham et al. in "Overcharge Protection of Secondary Lithium Batteries", published in the Proceedings of the 33rd International Power Sources Symposium in 1988, suggested the addition of lithium halides (LiBr and LiI) to the same liquid electrolyte.

The use of organic shuttle additives in liquid electrolytes of rechargeable lithium cells has also been proposed. Halpert et al., in "Status of the Development of Rechargeable Lithium Cells'", published in the Journal of Power Sources, 47 (1994) at pp. 287–294, disclosed results from the use of tetramethylphenylene diamine as an additive in a liquid electrolyte for a lithium-titanium disulfide rechargeable cell. The use of metallocenes, such as ferrocene, as additives to a liquid electrolyte for overcharge protection has also been suggested by Golovin et al., in "Applications of Metallocenes in Rechargeable Lithium Batteries for Overcharge Protection", Journal of the Electrochemical Society, Vol. 139, No. 1 (1992), at pp. 5–10.

However, the application of such technology to solid polymer electrolytes such as, for example, solid polyethylene oxide filled with a compound such as lithium trifluoromethanesulfonimide, which acts both as an ionically conducting electrolyte and as an electronically insulating separator, has not been reported, probably because of the many problems which would be associated with the use of an overcharge-limiting shuttle material in solid polymer electrolytes. For example, such solid polymer electrolyte/separators must be used at elevated temperatures (temperatures of at least about 60° C.) where additive volatility is greater, and their higher viscosity will result in slower diffusion rates, especially for large molecules

SUMMARY OF THE INVENTION

Quite surprisingly, however, we have discovered a class of redox shuttle additives, comprising organic compounds (preferably aromatic and either nitrogen-containing or anionic, and most preferably both), which can be used in a high temperature (85° C. or higher) solid polymer electrolyte rechargeable electrochemical storage cell (comprising a negative electrode, a positive electrode, and a solid polymer electrolyte) to provide overcharge protection to the cell. The organic redox additives or shuttles are characterized by a high diffusion coefficient of at least $2.1 \times 10^{-8}$ cm$^2$/second and a high onset potential of 2.5 volts or higher. Examples of such organic redox shuttle additives include an alkali metal salt of 1,2,4-triazole, an alkali metal salt of imidazole, a dialkali metal salt of 3,4-dihydroxy-3-cyclobutene-1,2-dione, 2,3,5,6-tetramethylpyrazine, 1,3,5-tricyanobenzene, and N,N,N'N'-tetramethylphenylene-diamine

DETAILED DESCRIPTION OF THE INVENTION

The invention comprises a solid polymer electrolyte electrochemical storage cell with an organic redox shuttle additive in the cell to prevent damage to the cell by overcharging. While the positive and negative electrodes of the electrochemical cell of the invention may, respectively, comprise a number of conventional electrode materials, the redox additives to be described herein find particularly utility in solid polymer electrolyte rechargeable lithium cells, i.e., a solid polymer electrolyte rechargeable electrochemical cell wherein the negative electrode is lithium and/or a lithium compound, and the metal compound or compounds used in the solid electrolyte are lithium compounds. The electrodes of the rechargeable cell will herein be referred to as positive and negative electrodes (rather than cathodes and anodes), with the negative electrode defined as the source of electrons flowing through an external circuit through which the battery is discharged, with the direction of current flow being from the negative to the positive electrode, the positive electrode thus acting as a sink of electrons.

a. The Cell

The solid polymer electrolyte rechargeable electrochemical cell of the invention having the organic redox additive therein may, therefore, be referred to herein as a rechargeable lithium cell, by way of example, and not of limitation, it being understood that the organic redox shuttle additives to be described herein may have application to other solid polymer electrolyte rechargeable electrochemical storage cells as well as lithium cells.

Figure 1:
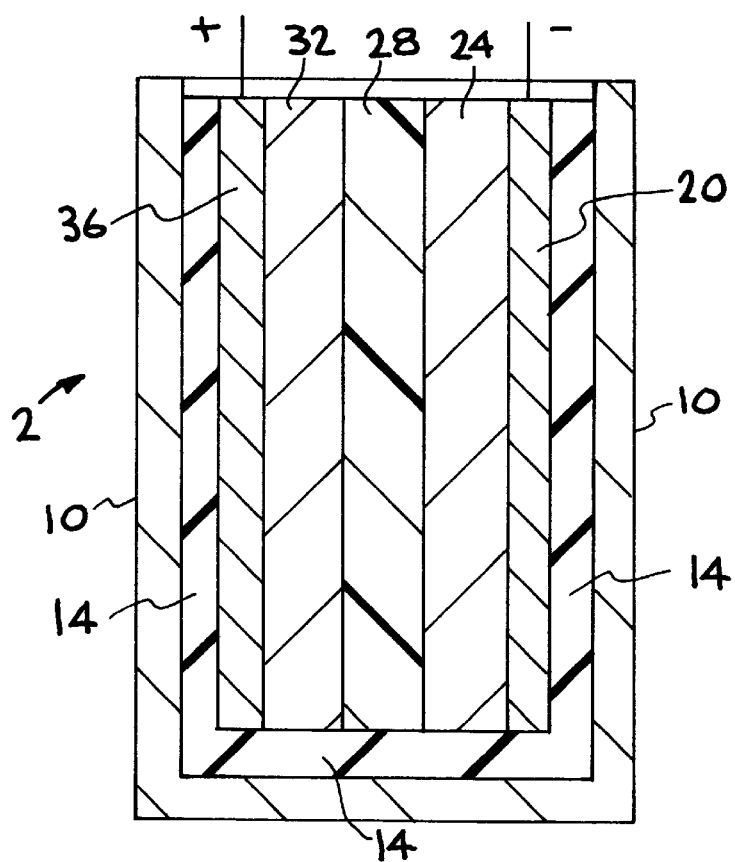
FIG. 1 is a vertical cross-sectional view of a solid polymer electrolyte rechargeable electrochemical storage cell constructed in accordance with the invention with an organic redox shuttle additive in the cell

Turning now to FIG. 1, an electrochemical storage cell having a solid polymer electrolyte is generally shown at 2 comprising a non-reactive outer shell or container 10 containing the active materials of the cell. Container 10 may comprise any conventional electrochemical storage cell case, such as a durable plastic or hard rubber material or a non-reactive metal such as stainless steel. Particularly when a metal is used in the formation of container 10, an optional insulating lining 14 may also be provided.

Adjacent one sidewall of container 10 is negative electrode current collector 20, which may comprise a nonreactive metal sheet or mesh, e.g., a nickel, copper, or stainless steel material. Negative electrode collector 20 may (as shown) be mounted next to, and in contact with, negative electrode 24, which comprises the active electrode material. Alternatively, by providing a foil or mesh current collector onto which is mounted the active electrode material, negative electrode collector 20 and negative electrode 24 may comprise a unitary structure, hereinafter referred to as negative electrode 24.

In the illustrated embodiment, a positive electrode 32 is also shown mounted in container 10 next to, and in contact with, a metal electrode current collector 36. As in the case of negative electrode 24, positive electrode 32 and electrode current collector 36 may be consolidated into a single structure by constructing the metal current collector as a metal mesh or foil and then incorporating the active positive electrode material into or onto the current collector Shown mounted in juxtaposition between negative electrode 24 and positive electrode 32 in container 10 is a solid polymer electrolyte 28. Solid polymer electrolyte 28, while being ionically conducting, also serves as an electronic insulator or separator between negative electrode 24 and positive electrode 32.

b. The Negative Electrode

The active electrode material in negative electrode 24 may comprise metallic lithium or a lithium-containing material such as a lithiated carbon. Lithium-containing electrode materials may be preferable over the use of metallic lithium because of the reactivity of lithium, and the possible adverse effects of such metallic lithium reactivity on the redox shuttle additive which will be added to the solid electrolyte. However, for purposes of illustration, and not of limitation, negative electrode 24 will, at times herein, also be referred to as a lithium electrode.

c. The Solid Polymer Electrolyte/Separator

As described above, solid polymer electrolyte 28 is mounted in between, and in contact with, both negative electrode 24 and positive electrode 32, which will be described below. Solid polymer electrolyte 28 comprises a mixture of a solid organic polymer, which provides the electronic insulation properties of the solid polymer electrolyte; and a stable conductive lithium compound, which provides the ionic conduction properties of the solid polymer electrolyte.

The solid organic separator material in solid polymer electrolyte 28 may, by way of example, comprise a polyether such as polyethylene oxide (PEO), polypropylene oxide (PPO), copolymers of the above polymers, and amorphous polyethylene oxide such as oxymethylene-linked polyethylene oxide. The solid organic separator material such as those mentioned above may be used in pure form or mixed with minor amounts of other additives such as, for example, a propylene carbonate liquid solvent.

The stable conductive lithium compound in the solid polymer electrolyte/separator may comprise any lithium compound conventionally used in the formation of solid polymer electrolytes which will not react with the redox shuttle material such as, by way of example, lithium trifluoromethane sulfonate (lithium triflate) or lithium trifluoromethanesulfonimide (LiTFSI). Thus, the conductive lithium compound must be stable at the high operating temperatures (e.g., 85° C. to about 120° C.) normally encountered in the operation of a solid polymer electrolyte rechargeable electrochemical storage cell.

The solid polymer electrolyte may be prepared by mixing the solid polymer and conductive lithium compound with a liquid such as acetonitrile, acrylonitrile or any other suitable liquid such as propylene carbonate, or mixed solvents such as ethylene carbonate/dimethyl carbonate to form a solution, dispersion, or paste which may then be cast or formed into the desired thickness and shape of the solid polymer electrolyte/separator The ratio of polymer material to lithium compound in the solid polymer electrolyte, for example when the polymer is a polyether, ranges from 12 to 20 monomer units of the polymer per equivalent of lithium compound, e.g., $P(RO)_{12}LiX$ to $P(RO)_{20}LiX$ where RO is one monomeric unit of a polyether such as polyethylene oxide or polypropylene oxide, and X is the anion of the lithium compound. An optimum ratio of polymer material to lithium compound, when the polymer is a polyether such as polyethylene oxide or polypropylene oxide, and the lithium compound is lithium trifluoromethane sulfonimide (LiTFSI), is about 16 monomer units of the polymer per equivalent of lithium compound, e.g., $P(RO)_8LiTFSI$. That is, wherein sixteen ethylene oxide monomeric units per equivalent of LiTFSI lithium compound would be denoted as $P(EO)_{16}LiTFSI$, and sixteen propylene oxide monomeric units per equivalent of LiTFSI lithium compound would be denoted as $P(PO)_{16}LiTFSI$. For other solid electrolytes, i.e., for solid electrolytes utilizing other polymers, the polymer concentration may range from as little as about 1 to as much as about 1000 per mole of lithium compound in the solid electrolyte.

d. The Positive Electrode

Mounted next to solid polymer electrolyte/separator 28, in illustrated cell 2, is positive electrode 32. In the described preferred embodiment, the active positive electrode material of positive electrode 32 may comprise any conventional oxidizable lithium compound normally used in rechargeable lithium electrochemical storage cells such as a lithium manganese oxide compound, e.g., $Li_{2+x}Mn_4O_9$, where x is greater than 0 and less than 3. The active positive electrode material may also contain other optional additives such as, for example, carbon to increase the conductivity, or a dispersant to prevent clumping of insoluble materials in the composite positive electrode. The amount of optional conductive additive such as carbon added may range from 0 to 25 wt. % of the entire positive electrode mixture, and preferably will range from about 5 wt. % to about 15 wt. %, and typically will be about 10 wt. %. The amount of optional dispersant added to the composite positive electrode mixture will range from 0 to about 7 wt. %, and preferably from about 2 wt. % to about 5 wt. %. Any typical dispersant, such as a polyoxyethylene derivative, e.g., Brij-35, or a quaternary ammonium non-ionic detergent such as Triton X-100, may be used.

e. The Organic Redox Shuttle Additive

The organic redox shuttle additive of the invention provides the solid polymer electrolyte cell of the invention with protection against damage from overcharge of the cell, i.e., extending the life of the cell. Overcharge may be defined as charging of a cell to 150% or more of the ampere-hour capacity of the cell as determined during the initial 2–3 discharges of the cell. Cell life may be defined as the number of charge/discharge cycles during which the cell maintains over 50% of its a ampere-hour capacity. Protection of the cell against overcharge (by using the organic redox shuttle additive of the invention in the cell) may be defined as extending the life or total number of cycles of the cell; and preferably extending the life of the cell sufficiently to double the total number of charge/discharge cycles of the cell during which the cell maintains over 50% of its ampere-hour capacity.

In accordance with the invention, the organic redox shuttle additive of the invention for use with the solid polymer electrolyte cell of the invention comprises an organic compound which, in one preferred embodiment, comprises an aromatic compound which contains a plurality of nitrogen atoms. and which, in another preferred embodiment, is anionic. The aromatic ring structure of the additive is thought to result in the formation of more stable intermediaries during the charging and discharging of the additive, because of the shared or delocalization of the electrons. The nitrogen atoms, when present in the additive (in replacement of either —CH groups and/or —CH$_2$— groups in the ring itself) add more electronegativity to the additive, since the nitrogen atom is electron-rich. The redox shuttle additive is further characterized as an additive which possesses, in both its oxidized and reduced forms, a high diffusion coefficient, i.e., when oxidized at the positive electrode, the shuttle material will quickly diffuse through the cell to the negative electrode where it is reduced, and the reduced shuttle material will then diffuse quickly back to the positive electrode of the cell.

This diffusion of the redox shuttle additive (in either its reduced or oxidized states) must be in sufficient concentration to permit the shuttle to transport all of the charging current when the cell is in overcharge. By use of the term "high diffusion coefficient" is meant a diffusion coefficient of at least about $2.1 \times 10^{-8}$ cm$^2$/second, which can be derived from equation (2) above as being capable of providing a one-electron redox shuttle current density of 0.1 milliAmp/cm$^2$ (mA/cm$^2$) across a 20 micrometer ($\mu$m) separator with a redox additive concentration of 0.1 mole. Preferably, the high diffusion density will, however, be at least $1.4 \times 10^{-7}$ cm$^2$/second, and most preferably will be at least $2.1 \times 10^{-7}$ cm$^2$/second, i.e., capable of providing a current density of 1 (mA/cm$^2$) across a 20 micrometer ($\mu$m) separator with a redox additive concentration of 0.1 mole.

The redox shuttle additive of the invention must also have a high onset potential, i.e., the voltage level at which the redox additive commences oxidation at the positive electrode must be close to, but slightly below the potential level at which the cell is fully charged. The redox shuttle of the invention should have an onset potential of at least 2.5 volts, and preferably an onset potential of at least 3.0 volts.

The organic redox shuttle additive of the invention will usually be initially introduced into the electrochemical cell by mixing it with the solid polymer electrolyte material during formation of the solid polymer electrolyte/separator. However, all or some of the redox shuttle additive may also be introduced into the cell by mixing the additive with the positive electrode material. The amount of the redox shuttle additive which will be added to the cell will be at least that amount which is capable of carrying the charge applied to the cell by the charging current during overcharge of the cell. Therefore, the minimum amount of the redox shuttle additive used in the cell will depend upon the capacity of the cell and the resulting cell charging current. By determining certain variable parameters, such as the charging current to be applied to the cell and the separator thickness between the electrode; and based on the physical characteristics of the particular redox shuttle additive, such as the diffusion coefficient of the material; the minimum amount of redox shuttle additive to be added to a given cell can be determined, using the previously described formula (1) above.

Examples of aromatic organic additives possessing a plurality of nitrogen atoms, a diffusion coefficient of at least $2.1 \times 10^{-8}$ cm$^2$/s, and an onset potential of at least 2.5 volts, and the capability of extending the life of a rechargeable cell, include the following:

| Additive | OnSet Potential | Diffusion Coefficient |
|---|---|---|
| alkali metal salt of 1,2,4-triazole | 3.1 v | $2.9 \times 10^{-7}$ cm$^2$/s |
| alkali metal salt of imidazole | 2.5 v | $2.1 \times 10^{-7}$ cm$^2$/s |
| 1,3,5-tricyanobenzene | 2.9 v | $1.4 \times 10^{-7}$ cm$^2$/s |
| N,N,N'N'-tetramethyl phenylenediamine | 3.2 v | $1.0 \times 10^{-7}$ cm$^2$/s |
| 2,3,5,6-tetramethylpyrazine | 3.3 v | $3.1 \times 10^{-8}$ cm$^2$/s |

Examples of anionic organic additives possessing a diffusion coefficient of at least $2.1 \times 10^{-8}$ cm$^2$/s, and an onset potential of at least 2.5 volts, and the capability of extending the life of a rechargeable cell, include the following:

| Additive | OnSet Potential | Diffusion Coefficient |
|---|---|---|
| alkali metal salt of 1,2,4-triazole | 3.1 v | $2.9 \times 10^{-7}$ cm$^2$/s |
| alkali metal salt of imidazole | 2.5 v | $2.1 \times 10^{-7}$ cm$^2$/s |
| dialkali metal salt of 3-4-dihydroxy-3-cyclobutene-1,2-dione | 3.1 v | $1.0 \times 10^{-7}$ cm$^2$/s |

Of the above additives, particularly preferred are 1,3,5-tricyanobenzene and the alkali metal salts of 1,2,4-triazole and imidazole, which all are aromatic compounds having a diffusion coefficient of at least $1.4 \times 10^{-7}$ cm$^2$/s. More particularly preferred of these additives are the alkali metal salts of 1,2,4-triazole and imidazole, which have respective onset voltages of 3.1 v and 2.5 v and diffusion coefficients of at least $2.1 \times 10^{-7}$ cm$^2$/s, and which are both anionic nitrogen-containing additives. The most particularly preferred of these additives is the alkali metal salt of 1,2,4-triazole, which has an onset voltage of 3.1 v and a diffusion coefficient of $2.9 \times 10^{-7}$ cm$^2$/s.

It should be noted that in some instances, the alkali metal salt additive tested was the sodium salt, rather than the lithium salt. It will be understood, however, that for a lithium cell, it may be preferable to use the lithium salt of the particular redox shuttle additive and vice versa for a sodium cell, so the generic term has been used to describe the salt.

f. Example

To illustrate the effects of the redox shuttle additives of the invention on the capacity retention of solid polymer electrolyte cells which have been overcharged, six test cells were constructed, each having a lithium electrode comprising lithium metal on a stainless steel mesh current collector, a solid polymer electrolyte/separator of approximately 200 $\mu$m thickness comprising a 16:1 ratio of polyethylene oxide (PEO) and lithium trifluoromethane sulfonimide (LiTFSI) on a tetrafluoroethylene (PTFE) plate, and a positive electrode comprising a mixture of 30 wt. % Li$_2$Mn$_4$O$_9$, 10 wt. % carbon, 2 wt. % Brij dispersant, and 58 wt. % of a mixture of a 16:1 ratio of PEO and LiTFS.

Figure 2:
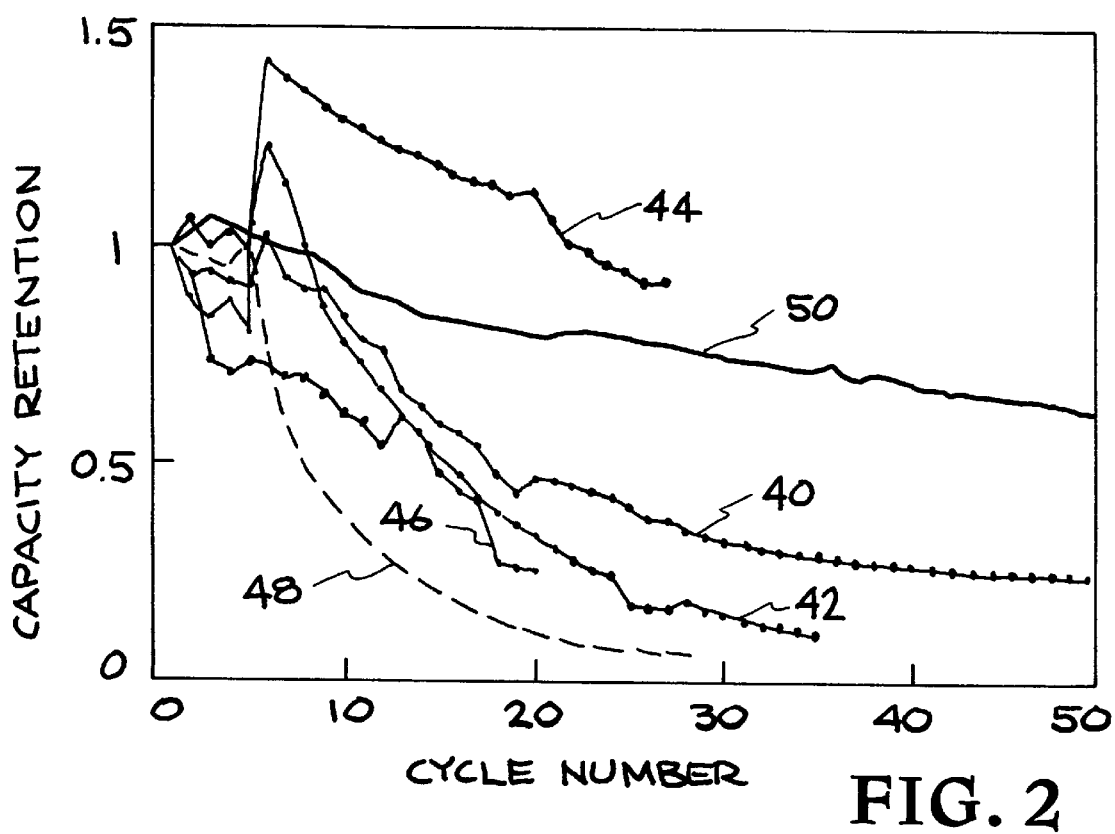
FIG. 2 is a graph showing the remaining capacity of solid polymer electrolyte rechargeable cells protected with the organic redox shuttle additive of the invention after repeated overcharging of the cells

Organic redox shuttle additives of the invention were added to four of the test cells by respectively adding to the solid electrolyte/separators of the cells (during construction of the respective solid electrolyte/separators): 0.2 M 1,3,5-tricyano-benzene (TCB), 0.3 M tetracyanodimethane (TCNQ), 0.3 M sodium salt of imidazole (NaIAZ), and 0.3 M sodium salt of 1,2,4-triazole (NaTAZ). The six cells were then heated to 85° C. and cycled at 0.1 mA/cm$^2$ (C/4) to a 4.0 v charge limit and then discharged down to 2.5 v for five cycles, after which five of the six cells (one cell without the shuttle additive and four respectively loaded with the various above recited shuttle additives) were then overcharged to 150% of the normal initial capacity on each subsequent cycle. FIG. 2 illustrates the discharge capacities (normalized to the initial value for each cell) vs. cycle number for protected cells using the above four redox shuttle additives (TCB, TCNQ, NaIAZ, and NaTAZ shown at 40, 42, 44 and 46, respectively), as well as one unprotected cell subjected to the same overcharge conditions and one unprotected cell charged only to the 4.0 v limit, shown at 48 and 50, respectively. It will be seen from FIG. 2 that these redox shuttle additives provide significant and lasting overcharge protection even under extremely adverse conditions.

Thus, the invention provides an improved solid polymer electrolyte rechargeable electrochemical cell having overcharge protection by the incorporation of an organic redox shuttle additive which is inactive under normal conditions, but which oxidizes at the positive electrode when the cell potential exceeds the desired voltage. The oxidized form of the shuttle additive diffuses through the solid electrolyte to the negative electrode where it is reduced to its original (unoxidized) state, and then migrates back through the solid polymer electrolyte again to reach the positive electrode in its original state. The onset voltage at which the redox shuttle additive begins to charge is at least 2.5 volts, and preferably at least about 3.0 volts. The organic redox shuttle additive has a high diffusivity (in both the charged and uncharged states) through the solid electrolyte of at least about $2.1 \times 10^{-8}$ cm$^2$/second, preferably at least about $1.4 \times 10^{-7}$ cm$^2$/second, and most preferably about $2.1 \times 10^{-7}$ cm$^2$/second.

While a specific embodiment of the solid polymer electrolyte rechargeable electrochemical cell of the invention protected against overcharge by an organic redox shuttle additive has been illustrated and described in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. A solid polymer electrolyte rechargeable electrochemical cell having a positive electrode, a negative electrode, a solid polymer electrolyte comprising a polyether polymer, and an organic redox shuttle additive selected from the group consisting of an alkali metal salt of 1,2,4-triazole, an alkali metal salt of imidazole, 2,3,5,6-tetramethylpyrazine, 1,3,5-tricyanobenzene and a dialkali metal salt of 3-4-dihydroxy-3-cyclobutene-1.2-dione, to protect the cell against overcharging.

2. The electrochemical cell of claim 1 wherein the concentration of said organic redox shuttle additive in said cell is sufficient to permit said redox shuttle additive to carry all of the charging current when said cell is being overcharged.

3. The electrochemical cell of claim 1 wherein said organic redox shuttle additive is further characterized by a diffusion coefficient of at least about $2.1 \times 10^{-8}$ cm$^2$.

4. The electrochemical cell of claim 1 wherein said organic redox shuttle additive is further characterized by an onset voltage of at least about 2.5 volts.

5. The electrochemical cell of claim 1 wherein said positive electrode, said negative electrode, said solid polymer electrolyte, and said organic redox shuttle additive which protects said cell against overcharging are each capable of functioning in said cell at an elevated temperature of at least about 85° C.

6. The electrochemical cell of claim 1 wherein said negative electrode contains lithium.

7. The electrochemical cell of claim 1 wherein said solid polymer electrolyte includes a lithium compound.

8. An electrochemical cell capable of functioning at a temperature of at least about 85° C. comprising a positive electrode, a negative electrode, a solid polymer electrolyte, and an organic redox shuttle additive selected from the group consisting of an alkali metal salt of 1,2,4-triazole, an alkali metal salt of imidazole, and 1,3,5-tricyanobenzene to protect the cell against overcharging and further characterized by a diffusion coefficient of at least about $1.4 \times 10^{-7}$ cm$^2$ and an onset voltage of at least about 2.5 volts.

9. The electrochemical cell of claim 8 wherein the concentration of said redox shuttle additive in said cell is sufficient to permit said redox shuttle additive to carry all of the charging current when said cell is being overcharged.

10. The electrochemical cell of claim 8 wherein said negative electrode contains lithium.

11. The electrochemical cell of claim 8 wherein said solid polymer electrolyte includes a lithium compound and an organic polymer.

12. An electrochemical cell capable of functioning at a temperature of at least about 85° C. comprising a lithium-containing negative electrode, a positive electrode, a solid polymer electrolyte comprising a solid polymer and a lithium compound, and an organic redox shuttle additive selected from the group consisting of an alkali metal salt of 1,2,4-triazole and an alkali metal salt of imidazole to protect the cell against overcharging comprising an aromatic compound containing a plurality of nitrogen atoms and further characterized by a diffusion coefficient of at least about $2.1 \times 10^{-7}$ cm$^2$ and an onset voltage of at least about 2.5 volts, said redox shuttle additive present in said cell in a concentration which is sufficient to permit said redox shuttle additive to carry all of the charging current.

13. The electrochemical cell of claim 12 wherein said redox shuttle additive is further characterized by an onset voltage of at least about 3.0 volts.

14. The electrochemical cell of claim 13 wherein said redox shuttle additive comprises an alkali metal salt of 1,2,4-triazole.

\* \* \* \* \*